United States Patent [19]
Laurie

[11] 3,947,359
[45] Mar. 30, 1976

[54] AERATION AND MIXING OF LIQUIDS

[76] Inventor: Alec Hibburd Laurie, 21 Lyndewode Road, Cambridge, England

[22] Filed: Mar. 6, 1974

[21] Appl. No.: 449,208

[30] Foreign Application Priority Data
Mar. 6, 1974 United Kingdom............ 10956/74

[52] U.S. Cl................ 210/221 P; 261/77; 261/113; 261/DIG. 75
[51] Int. Cl.²...................... B03D 1/24; G05D 11/02
[58] Field of Search......... 210/15, 63, 44, 220, 221, 210/169; 261/77, 76, DIG. 75, 113; 137/3, 604

[56] References Cited
UNITED STATES PATENTS

| | | | |
|---|---|---|---|
| 2,186,371 | 1/1940 | Durdin, Jr............................ | 210/221 |
| 2,744,065 | 5/1956 | Lacey .................................. | 261/77 |
| 3,734,111 | 5/1973 | McClintock ......................... | 261/DIG. 75 |

FOREIGN PATENTS OR APPLICATIONS

| | | | |
|---|---|---|---|
| 2,027,969 | 5/1970 | Germany...................... | 261/DIG. 75 |

*Primary Examiner*—Thomas G. Wyse
*Assistant Examiner*—Benoît Castel
*Attorney, Agent, or Firm*—Shoemaker and Mattare, Ltd.

[57] ABSTRACT

This invention relates to the mixing of gases with liquids and particularly aeration of predominantly water based liquids. The invention provides an apparatus for promoting gas/liquid exchange in a liquid impoundment in which a riser tube is disposed vertically in the liquid. Flow of the liquid up the riser tube is promoted by introducing gas bubbles into the liquid inside the riser tube. The riser tube has a baffle or restrictor giving rise to a region of fast flowing liquid in the riser tube and the bubbles of gas are introduced in the region of fast flowing liquid, the arrangement is such that the baffle or restrictor causes an abrupt change of velocity and hence turbulence as the liquid flows upwardly in the riser tube past the said baffle or restrictor.

14 Claims, 6 Drawing Figures

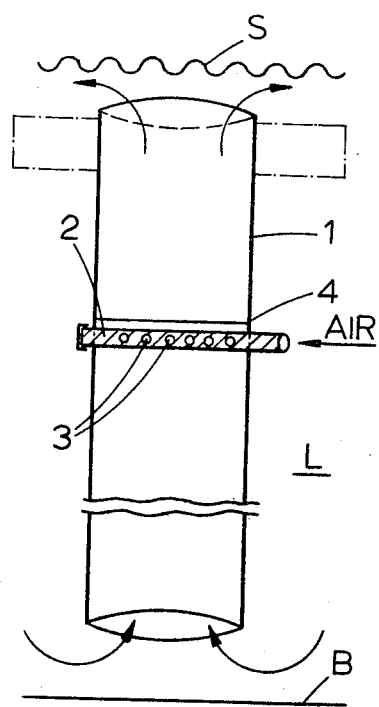
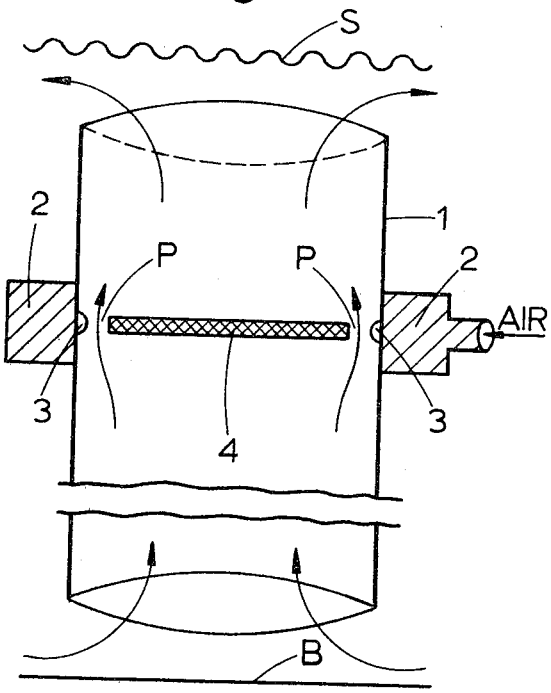
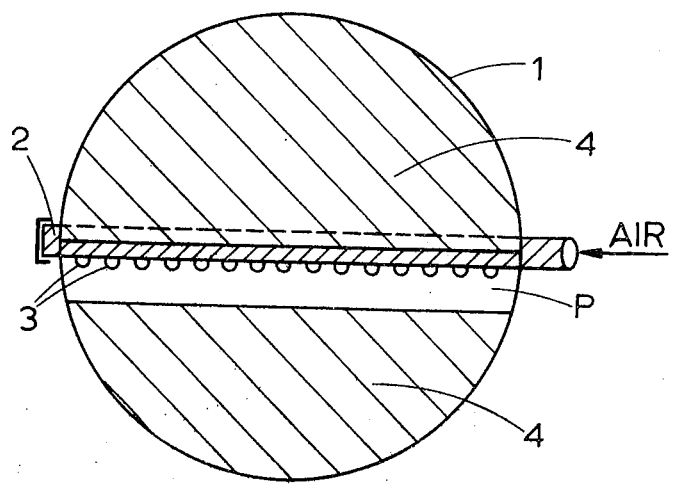

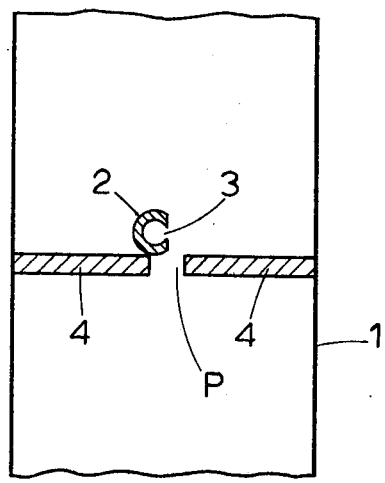
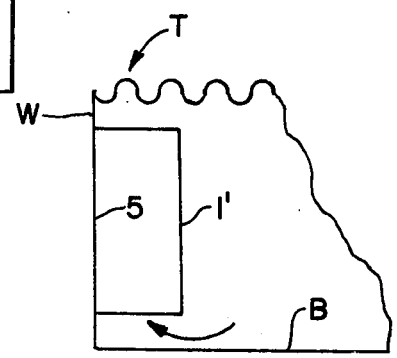
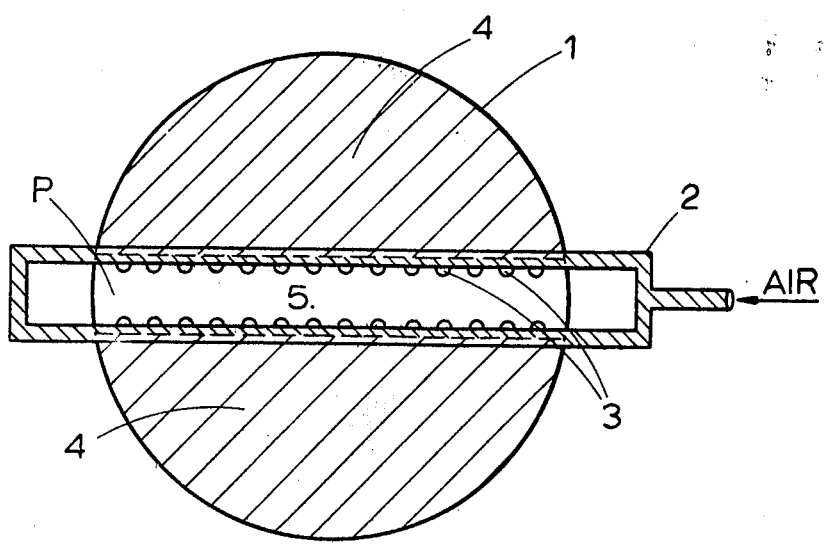

AERATION AND MIXING OF LIQUIDS

This invention relates to an apparatus for aerating liquids in order to introduce oxygen in such a way as to expose substantially all the liquid in a container or impoundment to an oxygenation process. At the same time the method and apparatus to be described increases the efficiency of gas exchange between air bubbles and the liquid, and consequently reduces the operating cost.

Any technique which results in a high rate of gas diffusion outwards i.e. from bubble to liquid also provides the opposite effect of removing dissolved gases from liquid into the bubbles.

This is called "stripping" and it is widely used in chemical industry for removing unwanted gases in certain processes. It is also one of the side effects expected in intensive fish culture for removing ammonia, a by product of fish excreta and lethal to fish in very small concentrations.

The invention makes use of the airlift principle whereby liquids are propelled upwards by introducing air or other oxygenating gas at the bottom of a tube or conduit; hereinafter referred to as "a riser tube" and which need not be cylindrical and may be partially formed by a wall section of the tank or other impoundment, thus reducing the density of the column of mixed liquid and gas. Such an arrangement is effective in transferring liquids from, for example, the bottom of a tank to the surface.

However, as a means of gas transfer from bubbles to liquid it is not effective because the induced velocity in the riser tube is too great to allow the bubbles to diffuse oxygen into the liquid.

For example, a simple airlift riser tube of cylindrical shape and having a diameter of 30 cm and a length of 3 meters, supplied at the bottom with air at a rate of 19 cubic meters per hour, entrains water at the bottom of the tube and dishcarges water just below the surface at a velocity of 1.4 meters per second. The water will, in this instance, take, theoretically (temperature and viscosity being variants) 2.14 seconds to traverse the length of the tube, while the air bubbles rising in the moving water, at for example, 25 centimeters per second, traverse the tube in 1.8 seconds. Thus, the time available for the bubbles to diffuse oxygen is severely curtailed.

The problem of effective aeration combined with total circulation of fluid can be defined as follows.

The potential energy in the compressed air of the bubbles is far in excess of that which is required to promote circulation through the riser tube. If, therefore, the excess energy can be absorbed, the water in which the bubbles are rising will be decelerated, thus improving oxygen transfer. Additionally if the surplus energy can be exploited to reduce the diameter of the bubbles a further benefit in gas exchange is secured. Both the above advantages are achieved by this invention of which a description follows.

Broadly stated according to this invention, a riser tube which may be of circular or other cross-sectional shape, is placed in water or other liquid to be treated, and is secured so that its lower end is close to the bottom of the impoundment leaving a clearance at its bottom of not less than one quarter of the maximum dimension of the internal bore of the riser tube. The upper end of the tube is located so that it is submerged below the surface of the liquid at a depth which is not less than one quarter of the tube's maximum internal cross-sectional dimension.

An air diffuser consisting of a pipe coupled to a supply of compressed air is fixed transversely across or around the tube at any selected distance from the top, but preferably in such a position that its upper end is not more than one metre below the liquid surface. The pipe discharges air through nozzles or perforations whose size and number are predetermined in relation to the volume of air to be discharged, and the pipe is positioned so that the perforations are in a substantially horizontal plane, which is at right angles to the central axis of the riser tube. An essential feature of the invention is that a baffle or restrictor is located within the tube adjacent the diffuser pipe and is so shaped and arranged that a narrow passage is provided adjacent to the nozzles of the diffuser pipe through which passage the liquid may rise.

In one embodiment the baffle has a centrally located slot, cut in such a way that one side of the slot is aligned with a diffuser pipe which is also centrally located transversely of the tube while the parallel opposite side of the slot is offset from the tube center.

The area of the slot is a predetermined fraction of the cross-sectional area of the tube and is preferably less than one tenth thereof.

The diffuser pipe is preferably secured in contact with the baffle plate containing the slot so that all liquid transferred upwards from below the diffuser is compelled to pass through the slot and at right angles to the air bubbles emerging from the perforations in the diffuser pipe.

Operation is as follows:

Addition of air via the diffuser pipe causes a density reduction in the riser tube above the diffuser pipe. This in turn generates an upward flow of liquid throughout the riser tube.

Preferably the rate of air supply (volume/time), the total area of the diffuser perforations and the area of the baffle passage are so adjusted in relation to one another that the speed of liquid flow through the baffle passage is eight to twelve times faster than the average speed of liquid flow up the riser tube.

For example, let it be supposed that the rate of flow in an unobstructed riser tube would be 1.4 meters per second and that it is desirable to reduce the rate to 30 cm per second. This is done by adjusting the area of the slot in relation to the cross-sectional area of the riser tube so that the liquid flowing at 30 cm per second in the tube below the diffuser passes through the restricted area defined by the baffle at a velocity of the order of 10 times, that is to say 3 meters per second. Thus momentarily the liquid acquires considerable kinetic energy which absorbs the unwanted energy in an air input whose main purpose is to impart oxygen to the liquid. Moreover, the liquid above the baffle moves upwards at a rate which is limited by the delivery of liquid through the passage defined by the baffle. Consequently the volume of liquid passing a given point in unit time is equal both below the baffle, in the passage defined by the baffle and above the baffle.

A secondary effect is that the liquid flows past the perforations or nozzles in the diffuser at a high velocity, and this has the result that the emerging bubbles are swept away, or sheared, before they achieve the size at which they would normally detach themselves. In consequence the bubbles are both reduced in size and increased in number for a given volume of air applied. This results in an increase in the air-liquid interface which in turn magnifies the rate of oxygen transfer. This method of producing small bubbles is more economical in applied power than conventional methods which involve the diffusion of air through extremely small apertures resulting in increased applied pressure. By contrast the described method enables air to be discharged through relatively large perforations with no additional back pressure. The additional energy required to form small bubbles is supplied from the excess energy in the airlift system.

A further advantage is that the perforations in the diffuser tube, being relatively large, will be immune to blockage by pollutants in the air supply. Additionally, tests in raw sewage have shown that the rapid flow of liquid at right angles to the diffuser perforations prevents both blockage by particles in the sewage and bacterial growth which would otherwise tend to obstruct the perforations.

The air supply pipe may be duplicated so that the passage is constituted by the space between two pipes. The perforations in the two pipes are positioned so that they face each other across the passage. The baffle in this arrangement will be in two parts, preventing liquid flow except between a greater number of perforations in the diffuser pipes thus reducing the air velocity at each perforation and facilitating the production of smaller bubbles.

In another arrangement the air supply pipe may take the form of a collar attached to the outside of the riser tube. Perforations are formed in the wall of the tube, while the baffle plate occupies a major part of the inside area of the tube, leaving a narrow passage adjacent to the perforations in the riser tube wall.

The riser tube is preferably of circular cross-sectional shape. However, its cross section may be rectangular, hexagonal, octagonal or any other convenient shape.

The invention will be described by way of example with reference to the accompanying diagrammatic drawings in which:

FIG. 1 is the vertical cross-sectional view of a riser tube located in an impoundment;

FIG. 2 being a transverse cross-sectional view taken from above;

FIG. 3 is a vertical cross-sectional view showing an alternative arrangement to that depicted in FIG. 1;

FIG. 4 is a transverse cross-sectional view showing an alternative arrangement to that shown in FIG. 2;

FIG. 5 is a vertical cross-sectional view showing a third alternative arrangement to that shown in FIG. 1.

FIG. 6 is a vertical, cross-sectional view showing a fourth alternative arrangement to that shown in FIG. 1.

In the drawings the same reference numerals are employed for like or equivalent parts.

Referring first to FIG. 1, S represents the surface of a liquid impoundment and B represents the bottom of such impoundment.

The impoundment may for example be a tank for use in intensive fish culture or a tank in which aeration of a liquid impounded therein is required, for example in an effluent disposal installation. Alternatively the impoundment may be an artificial or natural water reservoir where it is desired to promote oxygenation of the water.

According to the invention there is located in said impoundment between the surface S thereof and the bottom B thereof a riser tube 1.

The riser tube 1 is conveniently of circular cross section although it may alternatively be of rectangular, hexagonal, octagonal or any other convenient cross-sectional shape.

Conveniently also, the riser tube 1 is of extruded synthetic plastics material and is arranged to remain substantially vertical when submerged beneath the surface of the liquid, generally designated L in FIG. 1.

To this end the upper end of the riser tube may be equipped with flotation means (shown in dot and dash lines in FIG. 1) while the lower end thereof may be weighted or anchored and preferably the latter.

The lower end of the riser tube 1 is so arranged as to leave a clearance between its lower end and the bottom B of the impoundment which is not less than one quarter of the maximum dimension of the internal bore of the riser tube 1.

The upper end of the riser tube 1 is so located that it is submerged below the surface S of the liquid in the impoundment at a depth which is not less than one quarter of the tube's maximum internal cross-sectional dimension.

If the surface of the liquid in the impoundment is subject to variation, the riser tube 1 may be made in two or more sections, one or more of which is telescopically slidable within another whereby the above described spatial relationships between the bottom of the tube and the bottom of the impoundment and the upper end of the tube and the surface of the liquid can be achieved.

The riser tube 1 is equipped with an air diffuser pipe 2 to which is supplied air from a source (not shown). The diffuser pipe 2 passes through the bore of the tube 1 and in its region located within the bore, the pipe is provided with nozzles, perforations or even narrow slits. The size, number and total area of the nozzles, perforations, or slits being predetermined in relation to the volume of air to be diffused. Such nozzles, perforations or slits are positioned in the horizontal plane which is at right angles to the central axis of the riser tube 1 and in all the embodiments shown such nozzles perforations or slits are generally designated 3.

According to an essential feature of the invention, a baffle or restrictor, generally designated 4, is located in the bore of the riser tube 1 adjacent the diffuser pipe 2 and is so shaped and arranged that a narrow passage is provided adjacent the perforations 3 of the diffuser pipe 2 through which passage, liquid L may rise when air is supplied to the pipe 2 and diffused through the perforations 3 thereof.

Referring to FIGS. 1 and 2 the restrictor or baffle 4 is a disc which transversely occludes substantially the whole of bore of the riser tube 1 except for a slot, constituting passage P in FIG. 2.

Referring to FIG. 2, one edge of the slot is located diametrally of the bore of the riser tube 1 while the other edge of the slot is spaced from and parallel to said first edge.

The diffuser pipe 2 is located beneath the baffle in FIG. 2 and its perforations 3 are aligned with the passage P preferably such that laminar flow takes place over the pipe 2.

In the arrangement depicted in FIG. 3 a generally similar configuration is adopted except that diffuser pipe 2 is located above the baffle 4.

However, in this arrangment again, the perforations 3 are located substantially diametrally of the bore of the riser tube 1.

In both the arrangements defined and depicted in FIGS. 1 to 3 a tube of circular cross section is illustrated by way of example. However, if tubes of other cross-sectional shape are employed, it is to be understood that if the baffle 4 has a passage P preferably disposed to extend over the maximum dimension of the bore of the tube 1 and diffuser pipe will be located above or below such passage in the same manner as previously described with reference to FIGS. 1 to 3.

The area of the slot or passage P is a predetermined fraction of the cross-sectional area of the riser tube 1 and is preferably less than one tenth thereof.

Preferably also, the rate of air supplied (volume of air supplied per unit time), the total area of the perforations in the diffuser pipe 2 and the total area of the passage P in the baffle 4 are so adjusted in relation to one another that the speed of liquid flow through the baffle passage P is eight to twelve times faster than the average speed of liquid flow in the riser tube, as promoted by the dispatch of air into the tube by way of perforations 3 in the diffuser pipe 2.

The addition of air into the riser tube 1 as above referred to, generates a reduction of density in the liquid above the baffle 4 thereby creating upward flow.

If it is supposed that the rate of flow in an unobstructed tube (that is, with the baffle or restrictor 4 omitted) is 1.4 meters per second, and if it is further assumed that it is desirable to reduce the rate of flow to 30 centimeters per second in order to permit diffusion of the air in the liquid above the baffle or restrictor 4, this can be achieved for example by causing the velocity of liquid flow through the passage P to be of the order to ten times the average flow in the riser tube 1, that is to say, 3 meters per second. Thus the liquid acquires considerable kinetic energy in proportion to the square of its velocity as it flows through the passage P and it is this kinetic energy which absorbs excessive energy in the air input to the liquid in the impoundment, as hereinbefore described.

The kinetic energy is in turn dissipated in the intense turbulence and friction which occur when the high velocity stream from P flows into a zone of slower moving liquid in the riser section above.

A secondary effect which is achieved is that the liquid flow past the diffuser pipe 2, flows at high velocity and then, has the result that the emerging bubbles of air are swept away, or sheared before they achieve the size at which they would normally detach themselves from the diffuser pipe 2. In consequence, the resultant bubbles are both comparatively small in size and increased in number in a given volume of applied air. This results in an increase in the air/liquid interface which in turn magnifies the rate of oxygen transfer.

Referring now to FIG. 4 there is here shown an alternative arrangement in which the baffle 4 has a central slot and the diffuser pipe 2 is forked and has perforations 3 aligned with the opposite parallel edges of the central slot defining the passage P. This arrangement enables the air supply to be diffused through a greater number of holes for a comparable installation to those previously described, thus reducing the air velocity at each hole and facilitating the production of small bubbles and hence a greater oxygen transfer.

In an alternative arrangement as depicted in FIG. 5, the baffle 4 comprises a disc which leaves at its periphery a substantially wholly continuous annular passage P adjacent the internal bore of the riser tube 1. In this arrangement the air diffuser pipe 2 takes the form of a collar attached to the outside of the riser tube 1. Perforations are formed in the circumference of the tube 1, adjacent passage P and preferably level with the baffle 4.

Apart from this configuration the device shown in FIG. 5 operates in all respects in a manner comparable to the devices previously described with reference to FIGS. 1 to 4. Where the riser tube or conduit is other than circular in cross-section, one of its walls may be defined by part of the container tank or other impoundment in which it is located.

In FIG. 6 the riser tube 1' is shown as having one wall 5 thereof common to a wall W of the tank T in which the tube is positioned.

It will be noted that in all the embodiments of the invention illustrated, the passage past the baffle in the riser tube or conduit is arranged such that the liquid flow changes its velocity abruptly, as distinct from the change of velocity which would occur in a venturi, that is to say, a throated passage in which there exists walls on the downstream and upstream sides of the narrowest part of throat of the passage, so shaped that liquid flow through the passage changes velocity in such a way that a minimum of turbulence is imparted to the liquid. Notwithstanding this, an arrangement in which the boundaries of the passage are faired is not intended to be precluded from the scope of the present invention provided that an abrupt change accompanied by turbulence with maximum loss of energy is achieved.

The abrupt change of velocity and hence turbulence caused by the baffle is a distinctive feature of the present invention as compared with systems employing a venturi or other systems for example those in which the liquid is caused to follow a helical path up the riser tube.

Although the present invention is principally directed to methods and apparatus whereby liquids may be aerated, it will be appreciated that the method and apparatus is also suitable for and intended for use in the promotion of gas/liquid exchange where the gas is other than air or oxygen and the liquid is other than a predominantly water-based liquid. Application to the promotion of such gas/liquid exchange is not precluded from the scope of the following claims.

I claim:

1. Apparatus for promoting gas/liquid exchange, and particularly for aerating a liquid, comprising: a substantially vertically disposed open-ended riser tube having a bore therethrough and disposed in a body of liquid, with the upper end of the tube spaced below the surface of the body of liquid and the lower end of the tube close to but spaced above the bottom of the body of liquid; restrictor means located in the tube between the ends of the tube and not more than one meter from the surface of the liquid, and closing said tube to flow therethrough except for a passageway of reduced cross-section to impart turbulence to liquid flowing through the tube bore and resulting in a high velocity flow of liquid through the passageway; and gas diffuser means disposed at said restrictor means transversely to the axis of the tube and having a plurality of apertures therein arranged to introduce gas into the bore at said passageway in a direction perpendicular to the direction of flow of liquid therepast, to reduce the density of the material in the riser tube above the gas diffuser means and to induce upward flow of liquid through the bore and passageway, and wherein the rate of air supplied, the total area of the apertures in the gas diffuser means and the total area of the passage are related to the cross-sectional size of the bore, such that the velocity of liquid flowing through the passageway is eight to twelve times as great as the mean velocity of the liquid flowing through the bore of the riser tube, and wherein the gas diffuser means is positioned relative to the passageway such as to obtain laminar flow over the gas diffuser of the liquid flowing through the passageway, the velocity of the flow of liquid through the passageway resulting in shearing off of bubbles of gas leaving said apertures and thereby producing a large number of small bubbles with a resultant combined large surface area, and the high velocity flow of liquid leaving the passageway inducing substantial turbulence in the region of the riser tube bore above the passageway, to thus promote gas/liquid exchange.

2. Apparatus as in claim 1, wherein the restrictor means comprises a baffle plate having a peripheral edge portion spaced inwardly from the wall of the riser tube and defining with said riser tube said passageway, said passageway extending peripherally of the bore of the riser tube.

3. Apparatus as in claim 2, wherein the peripheral passage is adjacent the internal wall of the riser tube and the gas inlet tube comprises an annular collar surrounding the riser tube, said wall of the riser tube having a plurality of perforations therein in registry with the apertures in the collar, such that air supplied to the collar is introduced through the aligned perforations and into the peripheral passage.

4. Apparatus as in claim 1, wherein the restrictor means comprises a baffle plate fixed in the tube intermediate the ends of the tube.

5. Apparatus as in claim 1, wherein said restrictor means comprises a baffle plate, and said passageway comprises a slot formed in the baffle plate extending in the direction of the maximum cross-sectional dimension of the bore of the riser tube.

6. Apparatus as in claim 5, wherein the gas inlet tube is positioned above and immediately adjacent the baffle plate and slot, with the apertures of the gas inlet tube aligned with the slot.

7. Apparatus as in claim 5, wherein the gas inlet tube is positioned below and immediately adjacent the baffle plate and slot, with the apertures of the gas inlet tube aligned with the slot.

8. Apparatus as in claim 1, wherein the riser tube is cylindrical in shape.

9. Apparatus as in claim 1, wherein the riser tube comprises a material having a lower density than that of the liquid in which it is intended to be submerged, whereby the riser tube is buoyant in the liquid and thereby tends to adopt a substantially vertical position when submerged in the liquid.

10. Apparatus as in claim 1, wherein the restrictor means comprises a baffle plate and the gas inlet tube is in contacting relationship with the baffle plate.

11. Apparatus as in claim 1, wherein the riser tube is disposed in an impoundment containing a liquid, and means connected with the riser tube and with the bottom of the impoundment anchoring the lower end of the riser tube in the impoundment in the aforesaid spaced relationship.

12. Apparatus as in claim 1, wherein the riser tube is polygonal in cross-section.

13. Apparatus as in claim 1, wherein flotation means are connected with the upper end of the riser tube to maintain the riser tube substantially vertical in the liquid.

14. Apparatus as in claim 1, wherein the riser tube is disposed in a tank, said tank having a bottom and side walls, and the riser tube comprising in part a portion of one of the side walls of the tank.

* * * * *